United States Patent
Hayashi et al.

(10) Patent No.: US 10,926,721 B2
(45) Date of Patent: Feb. 23, 2021

(54) CONTROL SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shigeo Hayashi, Yokkaichi (JP); Hiroki Hirai, Mie (JP); Toshiaki Kakii, Osaka (JP); Mitsuaki Nishie, Yokohama (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 249 days.

(21) Appl. No.: 16/310,361

(22) PCT Filed: Jun. 15, 2017

(86) PCT No.: PCT/JP2017/022084
§ 371 (c)(1),
(2) Date: Dec. 14, 2018

(87) PCT Pub. No.: WO2017/217482
PCT Pub. Date: Dec. 21, 2017

(65) Prior Publication Data
US 2019/0184917 A1 Jun. 20, 2019

(30) Foreign Application Priority Data
Jun. 17, 2016 (JP) .............................. JP2016-120484

(51) Int. Cl.
*B60R 16/023* (2006.01)
*G06F 3/00* (2006.01)
(Continued)

(52) U.S. Cl.
CPC ........ *B60R 16/023* (2013.01); *B60R 16/0207* (2013.01); *G06F 3/00* (2013.01); *G06F 13/38* (2013.01)

(58) Field of Classification Search
CPC ..... B60R 16/023; B60R 16/0207; G06F 3/00; G06F 13/38
(Continued)

(56) References Cited

U.S. PATENT DOCUMENTS

2014/0103715 A1\* 4/2014 Ito ...................... B60R 16/0315
307/24

FOREIGN PATENT DOCUMENTS

JP 2000124953 A 4/2000
JP 2000332718 A 11/2000
(Continued)

OTHER PUBLICATIONS

International Search Report, Application No. PCT/JP2017/022084 dated Sep. 19, 2017.

*Primary Examiner* — Hal Kaplan
(74) *Attorney, Agent, or Firm* — Honigman LLP (57) ABSTRACT

A control system configured to reduce the number of terminals of a connector in an electronic control unit and reduce the insertion/extraction force of the connector includes an ECU having a first connector unit, and a wire harness unit having a second connector unit to be connected to the first connector unit. The ECU includes a multiplexing control circuit and a first signal line serving as a transmission path for a multiplexed signal. The second connector unit is provided with a second signal line serving as a transmission path for the multiplexed signal transmitted via the first signal line, and a multiplexing control circuit. The multiplexing control circuit performs at least one of a process of separating signals from the multiplexed signal transmitted via the (Continued)

second signal line and a process of multiplexing a plurality of signals and transmitting a multiplexed signal to the second signal line.

10 Claims, 4 Drawing Sheets

(51) Int. Cl.
  *G06F 13/38* (2006.01)
  *B60R 16/02* (2006.01)
(58) Field of Classification Search
  USPC .................................................. 307/9.1, 10.1
  See application file for complete search history.

(56) References Cited

FOREIGN PATENT DOCUMENTS

| | | |
|---|---|---|
| JP | 2005005148 A | 1/2005 |
| JP | 2009292353 A | 12/2009 |
| JP | 2013015987 A | 1/2013 |

* cited by examiner

CONTROL SYSTEM

CROSS-REFERENCE TO RELATED APPLICATIONS

This application is the U.S. national stage of PCT/JP2017/022084 filed Jun. 15, 2017, which claims priority of Japanese Patent Application No. JP 2016-120484 filed Jun. 17, 2016.

TECHNICAL FIELD

The present disclosure relates to a control system.

BACKGROUND

Various electronic devices such as a power window, a light, and a wiper are mounted in a vehicle, and these are connected to an electronic control unit (ECU) by a wire harness. In the case of connecting the ECU and a large number of devices by the wire harness, generally, a communication path to each device is secured in the ECU, and a large number of terminals corresponding to respective communication paths are provided in a connector of the ECU. Further, a connector of the wire harness connected to the connector of the ECU is also provided with a large number of terminals corresponding thereto, and these terminals are electrically connected to the respective devices via cables.

In recent years, sophistication and complication of in-vehicle technology have progressed.

When it is expected that the trend will become more prominent in the future, the number of electronic components (sensors, actuators, and the like) to be connected to the ECU is supposed to further increase. In particular, demands for an advanced driving support technology and an automatic driving technology have been increasing more and more recently, and in order to realize these demands more properly, an advanced sensing technology and an advanced motion control technology are required. For example, technologies using more electronic components, such as technologies that support drivers with low skill using a large number of sensors and actuators or technologies having redundancy so that the motion can continue even if any one of the systems fails, are required. In order to appropriately realize such technologies, the number of electronic components to be connected to the ECU has to be increased more and more. However, in this type of unit, as the number of devices connected to the ECU increases, the number of terminals to be arranged in the connector increases, which increase a size of the connector and consequently causes an increase in size of the entire ECU. In addition, when the number of terminals of the connector increases, there is also a problem that failure or deterioration in workability may be easily caused at the time of attachment/detachment work of the connectors since a larger insertion/extraction force is required when attaching and detaching the connectors. Such problems can occur not only in the ECU related to the advanced driving support technology and the automatic driving technology described above, but also in various ECUs installed in the vehicle as well.

On the other hand, JP 2005-5148 A discloses an example in which a plurality of actuators is connected to an ECU by cascode connection. According to this configuration, the number of devices directly connected to the ECU is suppressed and the number of terminals of the connector can be accordingly reduced, so that it is possible to reduce the insertion/extraction force of the connector. In the technology in JP 2005-5148 A, however, a large number of devices arranged at various positions in the vehicle have to be sequentially connected by cascode connection, and it is difficult to establish such connection in a limited space in the vehicle. Particularly, such cascode connection is not practical when attempting to construct an in-vehicle system in which a large number of electronic components are arranged in various places in order to respond to the demands for higher functionality of a vehicle as described above. This problem can also occur in various ECUs installed in the vehicle.

The present disclosure has been made in view of the above-described circumstances, and it is an object of the present disclosure to provide a configuration capable of reducing the number of terminals of a connector provided in an electronic control unit and thereby reducing the insertion/extraction force of the connector, and capable of connecting the electronic control unit and a plurality of devices arranged at various places more satisfactorily.

SUMMARY

A control system of the present disclosure includes an electronic control unit used for a vehicle and having a first connector unit and a wire harness unit having a second connector unit to be connected to the first connector unit in the vehicle. The electronic control unit includes a first signal line that is a signal line serving as a transmission path for a multiplexed signal and includes a first terminal arranged in the first connector unit and a first multiplexing control unit that performs at least one of a process of multiplexing a plurality of signals and transmitting a multiplexed signal to the first signal line and a process of separating a plurality of signals from a multiplexed signal transmitted via the first signal line. The wire harness unit includes a second signal line that is a signal line provided in the second connector unit and serving as a transmission path for the multiplexed signal transmitted via the first signal line and includes a second terminal, the second terminal being configured to be connected to the first terminal when the first connector unit and the second connector unit are coupled together and not to be connected to the first terminal when the first connector unit and the second connector unit are not coupled together. A second multiplexing control unit is provided in the second connector unit and performs at least one of a process of separating signals from the multiplexed signal transmitted via the second signal line and a process of multiplexing a plurality of signals and transmitting a multiplexed signal to the second signal line.

The control system of the present disclosure can perform a transmission of a multiplexed signal between the first multiplexing control unit provided in the electronic control unit and the second multiplexing control unit provided in the second connector unit (a connector unit to be connected to the first connector unit of the electronic control unit) of the wire harness unit. In other words, a path for a plurality of signal can be made common between the first connector unit of the electronic control unit and the second connector unit of the wire harness unit, with the result that the number of terminals can be reduced in these connector units and accordingly the insertion/extraction force can be reduced.

Further, the second multiplexing control unit is provided in the second connector unit (the connector unit to be connected to the first connector unit of the electronic control unit) of the wire harness unit. Therefore, paths for signals after being separated by the second multiplexing control unit or paths for signals before being multiplexed by the second multiplexing control unit can be individually provided between the second connector unit and a plurality of devices. That is, it is unnecessary to cascode-connect all of the devices that transmit signals to and from the electronic control unit, and paths to at least some of the devices are separately provided from the second connector unit. Therefore, a degree of freedom in arranging the devices and the wirings is increased, and the electronic control unit and a plurality of devices arranged in various places can be connected more satisfactorily.

Conventional in-vehicle technologies including the technology of JP 2005-5148 A have been based on an idea of desiring to reduce the number of electric wires constituting the wire harness as much as possible in order to reduce the size, weight, and the number of components. Accordingly, when incorporating the function of multiplexed communication, a design concept that a path of multiplexed communication should be constructed as long as possible has been generally used in order to secure as long a range in which the number of electric wires can be reduced as possible. However, the idea is changed in the present disclosure without directly following such a conventional design concept, and a path of multiplexed communication is constructed very short. That is, the second multiplexing control unit is provided in the second connector unit (the connector unit to be connected to the first connector unit of the electronic control unit) which is located very close to the first multiplexing control unit provided in the electronic control unit. By such a change of an idea, it is made possible to arrange the paths to at least some of the devices separately from the vicinity of the electronic control unit, so that a degree of freedom in the arrangement is enhanced.

DETAILED DESCRIPTION OF PREFERRED EMBODIMENTS

In the present disclosure, the first multiplexing control unit may perform at least a process of multiplexing a plurality of signals and transmitting a multiplexed signal to the first signal line, and a second multiplexing control unit may perform at least a process of separating a part of the signals included in the multiplexed signal transmitted via the second signal line. Further, the wire harness unit may include a cable for transmitting a remaining multiplexed signal not including the signals separated by the second multiplexing control unit out of the multiplexed signal transmitted via the second signal line, and a third multiplexing control unit that separates the remaining multiplexed signal transmitted via the cable.

According to the aforementioned configuration, it is possible to reduce a size and a scale of the second multiplexing control unit provided in the second connector unit and accordingly it is possible to reduce a size of the second connector unit itself, too. Further, in the wire harness unit, the number of wires from the second connector unit can be reduced.

In the present disclosure, the first multiplexing control unit may perform at least a process of multiplexing a plurality of signals and transmitting a multiplexed signal to the first signal line, and the second multiplexing control unit may perform at least a process of separating all the signals included in the multiplexed signal transmitted via the second signal line. Further, the wire harness unit may include a plurality of transmission cables for transmitting the respective signals separated by the second multiplexing control unit.

According to the aforementioned configuration, it is possible to provide the paths individually for all the signals separated by the second multiplexing control unit between the second connector unit and a plurality of devices. Therefore, a degree of freedom in arranging the devices and the wirings is further increased, and the electronic control unit and a plurality of devices arranged in various places can be connected more satisfactorily.

In the present disclosure, the first multiplexing control unit may perform a process of multiplexing a plurality of digital output signals to be output to an outside of the electronic control unit and transmitting a multiplexed signal to the first signal line and a process of separating a plurality of digital input signals from a multiplexed signal input from the outside of the electronic control unit via the first signal line. Further, the second multiplexing control unit may perform a process of separating a plurality of digital output signals from the multiplexed signal output from the electronic control unit and transmitted via the second signal line and a process of multiplexing a plurality of digital input signals to be input to the electronic control unit and transmitting a multiplexed signal to the second signal line.

According to the aforementioned configuration, a plurality of digital output signals to be output from the electronic control unit and a plurality of digital input signals to be input to the electronic control unit both can be transmitted between the connector units by way of the multiplexed signal. As a result, it is possible to further reduce the number of terminals of the connector units and it is accordingly possible to reduce the insertion/extraction force.

In the present disclosure, the wire harness unit may have a plurality of second multiplexing control units provided in the second connector unit, and a plurality of signal lines may be connected to each of the second multiplexing control units.

According to this configuration, it is possible in the second connector unit to generate a multiplexed signal in which more signals are multiplexed or to separate more signals from the multiplexed signal, which is more advantageous when the number of signals is large. In particular, if the second multiplexing control units each have a common circuit configuration, it is possible to cope with a large number of signals while using components in common.

First Embodiment

Hereinafter, a first embodiment embodying the present disclosure will be described.

Figure 1:
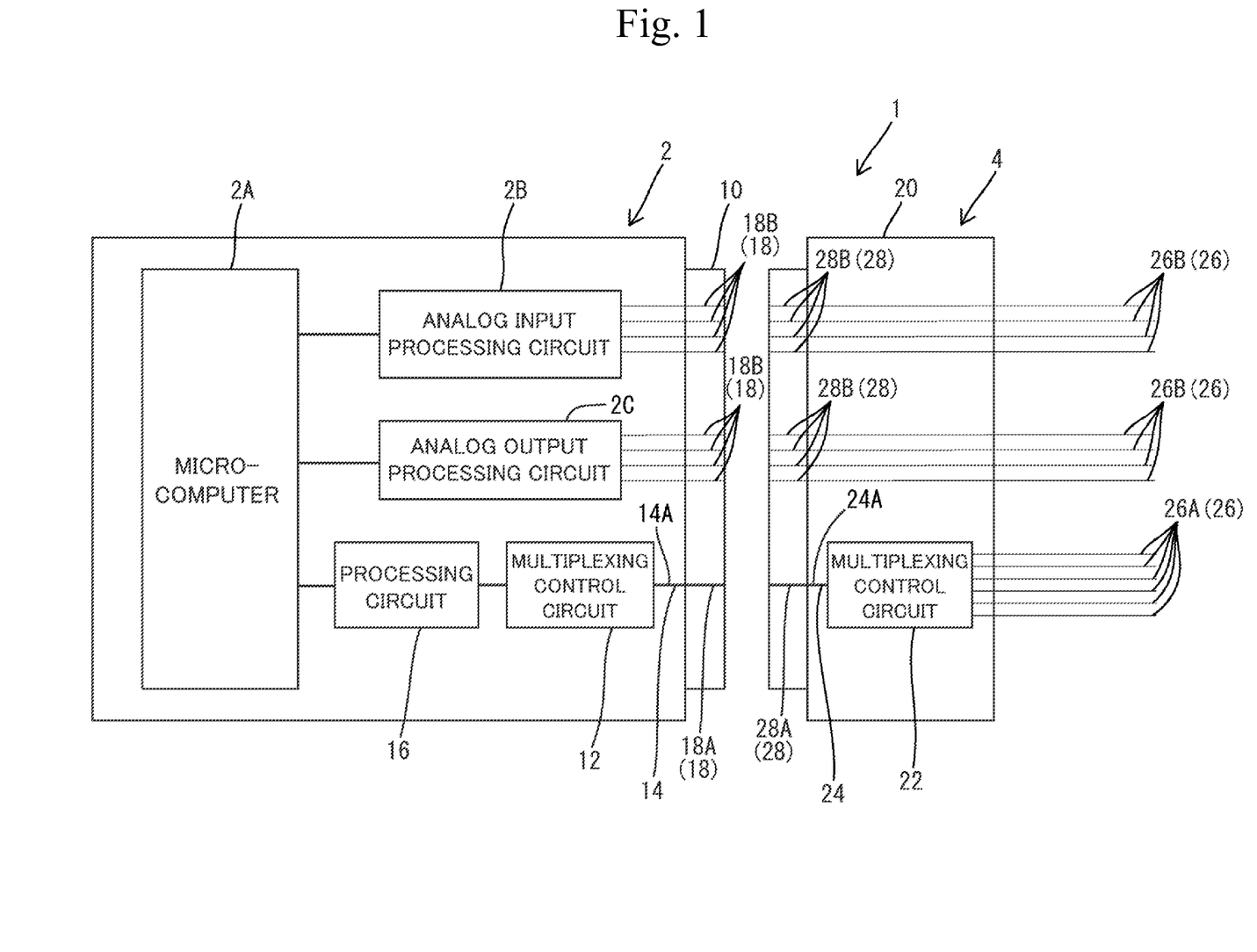
FIG. 1 is a block diagram schematically illustrating a control system according to a first embodiment.

A control system 1 illustrated in FIG. 1 is configured as a device capable of transmitting a multiplexed signal between connectors, and functions as an electronic control unit for a vehicle. The control system 1 includes an electronic control unit (ECU) 2 configured as an electronic control unit for the vehicle, and a wire harness unit 4 connected to the ECU 2. In the control system 1, a plurality of devices (not illustrated) distributed in the vehicle and the ECU 2 are connected in a communicable manner by a plurality of electric wires 26 provided in the wire harness unit 4 so that the ECU 2 can control the devices.

The ECU 2 is configured as, for example, a body-type ECU that controls interior components such as air conditioners and doors, or other ECUs. The ECU 2 includes a substrate (not illustrated) accommodated in a case (not illustrated) and a first connector unit 10 having a large number of terminals 18 electrically connected to the substrate. Various electronic components are mounted on the substrate of the ECU 2, and various conductive paths are arranged in the substrate and on a surface of the substrate, whereby an electronic circuit is constructed.

In the ECU 2, the first connector unit 10 is provided so as to be exposed to the outside of a case (not illustrated). In the first connector unit 10, a plurality of terminals 18 electrically connected to the substrate of the ECU 2 are provided in a connector housing. In the example of FIG. 1, the terminal electrically connected to a multiplexing control circuit 12 is a terminal 18A, and the other terminals are terminals 18B.

FIG. 1 schematically illustrates a part of an electronic circuit configured in the ECU 2. The ECU 2 mainly includes a microcomputer 2A, an analog input processing circuit 2B, an analog output processing circuit 2C, a processing circuit 16, and a multiplexing control circuit 12. The microcomputer 2A includes a CPU, a memory, an input/output port, and the like, and functions as a control circuit that performs various processes. The analog input processing circuit 2B includes an input processing circuit, an AD converter, and the like, and converts an analog signal input from the outside into a digital signal and inputs the digital signal to the microcomputer 2A. The analog output processing circuit 2C converts a signal (digital signal) to each device generated by the microcomputer 2A into an analog signal and outputs the analog signal.

The processing circuit 16 is constituted by, for example, a control LSI which controls an input to the multiplexing control circuit 12 and an output from the multiplexing control circuit 12. The multiplexing control circuit 12 includes a circuit that performs a process of multiplexing a plurality of types of digital output signals to be output to the outside of the ECU 2 and transmitting the multiplexed signal to the first signal line 14, and a circuit that performs a process of separating a plurality of types of digital input signals from a multiplexed signal input from the outside of the ECU 2 via the first signal line 14.

The multiplexing control circuit 12 corresponds to an example of the first multiplexing control unit, and is configured as a MUX/DMUX LSI which is an integrated circuit including, for example, a multiplexer circuit and a demultiplexer circuit. A plurality of types of digital output signals to be output to the outside of the ECU 2 are generated by the microcomputer 2A and supplied to the multiplexing control circuit 12 in such a manner that they are controlled by the processing circuit 16. The multiplexing control circuit 12 multiplexes a plurality of types of digital output signals supplied by the processing circuit 16 according to a known multiplexed communication method and transmits the multiplexed signal to the first signal line 14. Further, the multiplexing control circuit 12 has a function of separating a multiplexed signal transmitted from a multiplexing control circuit 22 to be described later via a second signal line 24 and the first signal line 14 according to a known separation method and inputting the separated signal to the processing circuit 16.

The first signal line 14 connected to the multiplexing control circuit 12 functions as a transmission path for multiplexed signals. The first signal line 14 is constituted by, for example, one or more signal lines, and includes a wiring unit 14A arranged on the substrate of the ECU 2 and a terminal 18A electrically conducted to the wiring unit 14A and arranged in the first connector unit 10. The first signal line 14 is electrically connected with the second signal line 24 when the first connector unit 10 and the second connector unit 20 are connected together.

The wire harness unit 4 includes a second connector unit 20 to be connected to the first connector unit 10 of the ECU 2, and a plurality of electric wires 26 extending from the second connector unit 20 and connected to a plurality of devices (not illustrated) arranged at various places in the vehicle. Among the electric wires 26, electric wires 26A are electrically connected to the multiplexing control circuit 22 and are configured as conductive paths that connect the multiplexing control circuit 22 and the respective devices in a communicable manner. Further, electric wires 26B are configured as conductive paths (dedicated lines) for electrically connecting the ECU 2 and the respective devices.

The second connector unit 20 has a configuration in which terminals 28, the multiplexing control circuit 22, and the like are accommodated in a connector housing. The second connector unit 20 includes a terminal 28A to be connected to the terminal 18A and terminals 28B to be respectively connected to the terminals 18B when the first connector unit 10 and the second connector unit 20 are connected together. The terminal 28A and a wiring unit 24A connected to the terminal 28A are configured as a second signal line 24. The second signal line 24 is constituted by one or more signal lines and, when the first connector unit 10 and the second connector unit are connected together, the second signal line 24 is electrically connected to the first signal line 14 thereby to serve as a transmission path for multiplexed signals.

The multiplexing control circuit 22 provided in the second connector unit 20 performs a process of separating a plurality of digital output signals from the multiplexed signal output from the ECU 2 and transmitted via the first signal line 14 and the second signal line 24 and a process of multiplexing a plurality of digital input signals to be input to the ECU 2 and transmitting the multiplexed signal to the second signal line 24.

The multiplexing control circuit 22 corresponds to an example of the second multiplexing control unit, and is configured as a MUX/DMUX LSI which is an integrated circuit including, for example, a multiplexer circuit and a demultiplexer circuit. A plurality of types of digital input signals to be input to the inside of the ECU 2 are supplied to the multiplexing control circuit 22 in such a manner that they are transmitted from the respective devices (sensors, actuators, etc.) in the vehicle via the respective electric wires 26A. The multiplexing control circuit 22 multiplexes a plurality of types of digital input signals supplied from the respective devices via the respective electric wires 26A according to a known multiplexing communication method and transmits the multiplexed signal to the second signal line 24. Further, the multiplexing control circuit 22 has a function of separating the multiplexed signal transmitted from the multiplexing control circuit 12 via the first signal line 14 and the second signal line 24 according to a known separation method and outputting the separated signals to the respective electric wires 26A.

As described above, the control system 1 of the present configuration can performs a transmission of the multiplexed signal between the multiplexing control circuit 12 provided in the ECU 2 and the multiplexing control circuit 22 provided in the second connector unit 20 (the connector unit to be connected to the first connector unit 10 of the ECU 2) of the wire harness unit 4. In other words, a path for a plurality of types of signals can be made common between the first connector unit 10 of the ECU 2 and the second connector unit 20 of the wire harness unit 4, with the result that the number of terminals can be reduced in these connector units and accordingly the insertion/extraction force can be reduced.

Further, the multiplexing control circuit 22 is provided in the second connector unit 20 (the connector unit to be connected to the first connector unit 10 of the ECU 2) of the wire harness unit 4. Therefore, like the electric wires 26A as illustrated in FIG. 1, the paths for the signals after being separated by the multiplexing control circuit 22 or the signals before being multiplexed by the multiplexing control circuit 22 can be individually provided between the second connector unit 20 and the respective devices. That is, it is unnecessary to cascode-connect all of the devices that transmit signals to and from the ECU 2, and the paths are separately provided from the second connector unit 20 without cascode-connecting. Therefore, a degree of freedom in arranging the devices and the wirings is increased, and the ECU 2 and a plurality of devices arranged in various places can be connected more satisfactorily.

Further, in the control system 1 of the present configuration, the multiplexing control circuit 12 is configured to perform a process of multiplexing a plurality of signals and transmitting the multiplexed signal to the first signal line 14, and the multiplexing control circuit 22 is configured to perform a process of separating all the signals included in the multiplexed signal transmitted via the second signal line 24. Further, the wire harness unit 4 is provided with a plurality of transmission cables (the electric wires 26A) for transmitting the respective signals separated by the multiplexing control circuit 22. According to this configuration, it is possible to provide the paths individually for all the signals separated by the multiplexing control circuit 22 between the second connector unit and a plurality of devices. Therefore, a degree of freedom in arranging the devices and the wirings is further increased, and the ECU 2 and a plurality of devices arranged in various places can be connected more satisfactorily.

Further, the multiplexing control circuit 22 is configured to multiplex all the digital input signals to be transmitted via the second signal line 24 (all the digital input signals input from a plurality of devices via the electric wires 26A) and transmit the multiplexed signal to the second signal line 24. According to this configuration, the paths for all the signals before being multiplexed by the multiplexing control circuit 22 can be individually provided between the second connector unit 20 and the respective devices.

Further, in the control system 1 of the present configuration, the multiplexing control circuit 12 is configured to perform a process of multiplexing a plurality of digital output signals to be output to the outside of the ECU 2 and transmitting the multiplexed signal to the first signal line 14, and a process of separating a plurality of digital input signals from the multiplexed signal input from the outside of the ECU 2 via the first signal line 14. The multiplexing control circuit 22 is configured to perform a process of separating a plurality of digital output signals from the multiplexed signal output from the ECU 2 and transmitted via the second signal line 24 and a process of multiplexing a plurality of digital input signals to be input to the ECU 2 and transmitting the multiplexed signal to the second signal line 24.

According to this configuration, a plurality of digital output signals to be output from the ECU 2 and a plurality of digital input signals to be input to the ECU 2 both can be transmitted between the connector units by way of the multiplexed signal. As a result, it is possible to further reduce the number of terminals of the connector units it is accordingly possible to reduce the insertion/extraction force.

Second Embodiment

Next, a second embodiment will be described with reference to FIG. 2, FIG. 3, and the like.

In a control system 201 of the second embodiment, only a configuration of a wire harness unit 204 is different from that of the wire harness unit 4 of the first embodiment, and the ECU 2 has the same configuration as that of the first embodiment. Therefore, in the following description, the same reference numerals are given to parts having the same configurations as those in the first embodiment, and the detailed explanation thereof will be omitted, and points different from the first embodiment will be mainly described.

Figure 2:
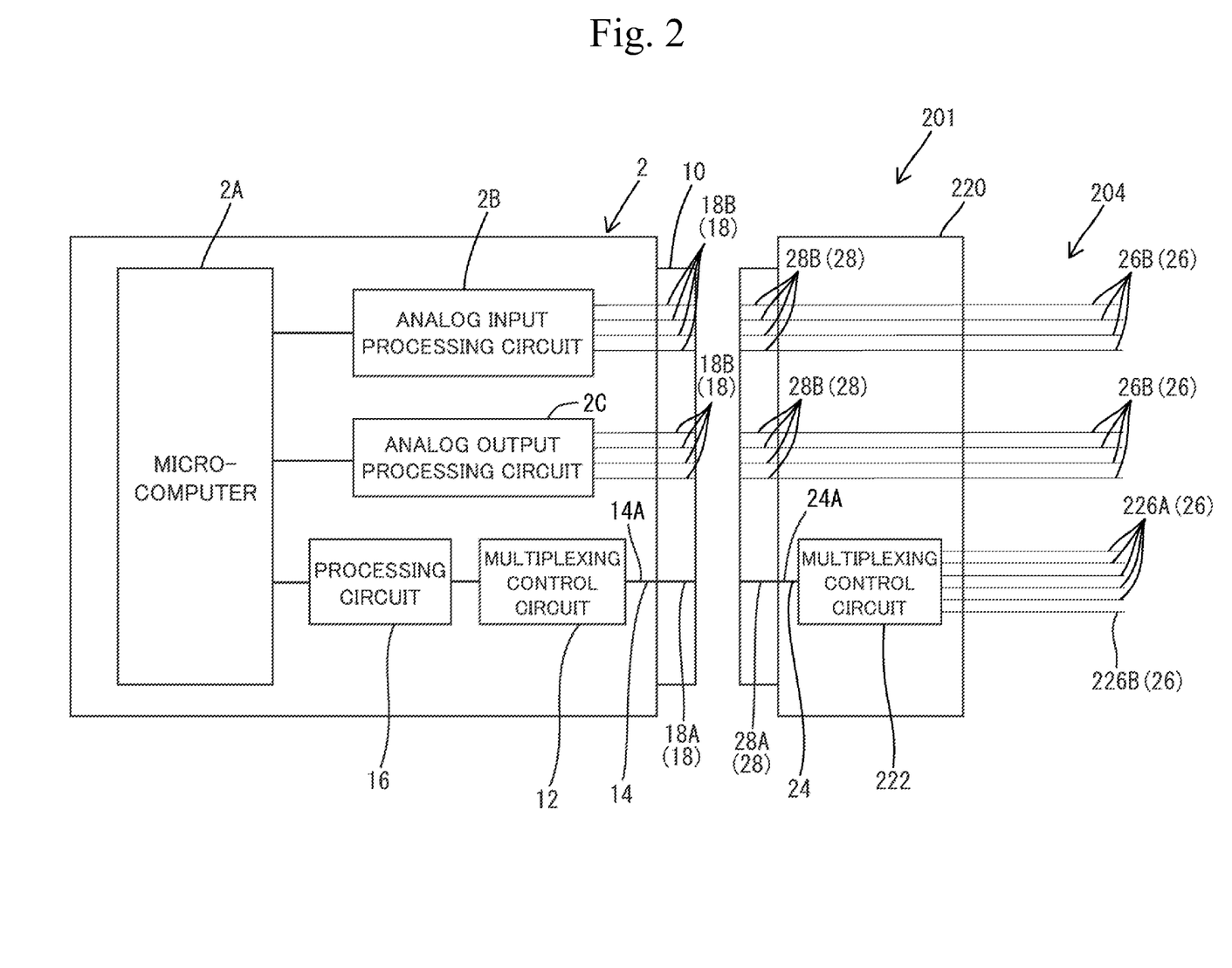
FIG. 2 is a block diagram schematically illustrating a control system according to a second embodiment.

Also in the control system 201 illustrated in FIG. 2, the multiplexing control circuit 12 of the ECU 2 (electronic control unit) corresponds to an example of the first multiplexing control unit, and is configured to perform a process of multiplexing a plurality of digital output signals to be output to the outside of the ECU 2 and transmitting the multiplexed signal to the first signal line 14 and a process of separating a plurality of digital input signals from the multiplexed signal input from the outside of the ECU 2 (more specifically, the multiplexing control circuit 222) via the first signal line 14.

The multiplexing control circuit 222 provided in a second connector unit 220 of the wire harness unit 204 corresponds to an example of the second multiplexing control unit, and is configured to perform a process of separating a plurality of digital output signals from the multiplexed signal output from the multiplexing control circuit 12 of the ECU 2 and transmitted via the first signal line 14 and the second signal line 24 and a process of multiplexing a plurality of digital input signals to be input to the ECU 2 and transmitting the multiplexed signal to the second signal line 24.

The multiplexing control circuit 222 is configured as a MUX/DMUX LSI which is an integrated circuit having, for example, a multiplexer circuit and a demultiplexer circuit. The multiplexing control circuit 222 is configured to perform a process of separating a part of the signals included in the multiplexed signal (more specifically, a plurality of types of signals forming a part of all types of signals included in the multiplexed signal) transmitted from the multiplexing control circuit 12 via the first signal line 14 and the second signal line 24. Each signal separated by the multiplexing control circuit 222 is individually transmitted to each device (not illustrated) by each electric wire 226A.

Figure 3:
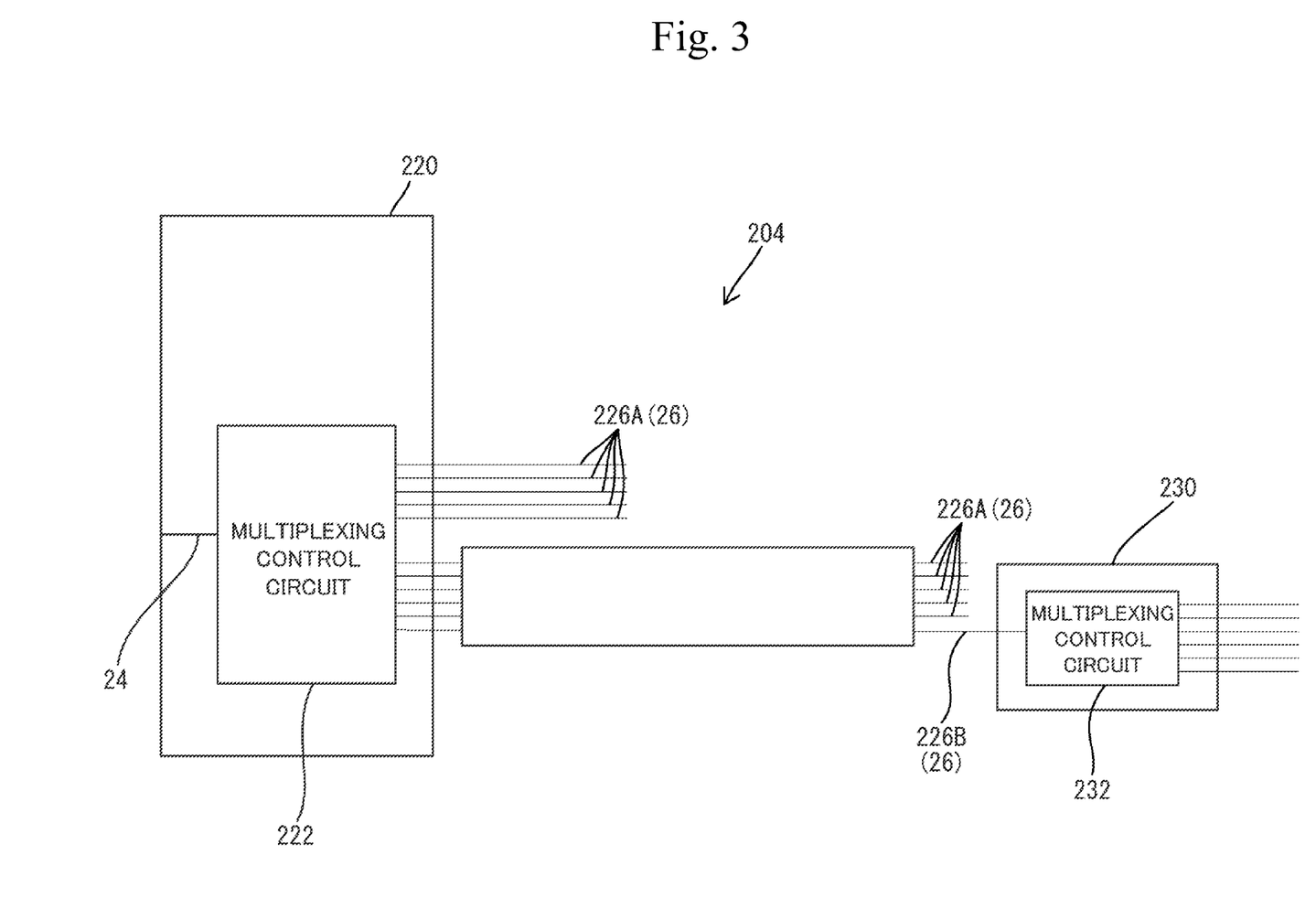
FIG. 3 is a block diagram schematically illustrating a wire harness unit of the control system of the second embodiment.

As illustrated in FIG. 3, the wire harness unit 204 is provided with a cable (electric wire 226B) for transmitting a remaining multiplexed signal not including the signals separated by the multiplexing control circuit 22 (the signals transmitted to the devices by the electric wires 226A) out of the multiplexed signal transmitted to the inside of the second connector unit 220 via the second signal line 24 (see also FIG. 2), and a third connector unit 230 connected to the electric wire 226B.

The remaining multiplexed signal, out of the multiplexed signal transmitted from the multiplexing control circuit 12 to the multiplexing control circuit 222, which has not been separated by the multiplexing control circuit 222 is transmitted via the electric wire 226B illustrated in FIG. 3 to the third connector unit 230 connected to the electric wire 226B, and supplied to the multiplexing control circuit 232. The multiplexing control circuit 232 corresponds to an example of the third multiplexing control unit and is configured as a MUX/DMUX LSI which is an integrated circuit having, for example, a multiplexer circuit and a demultiplexer circuit. The multiplexing control circuit 232 is configured to perform a process of separating all the signals included in the remaining multiplexed signal transmitted via the electric wire 226B. Each signal separated by the multiplexing control circuit 232 is individually transmitted to each device via each electric wire electrically connected to the multiplexing control circuit 232.

The multiplexing control circuit 232 may be configured to multiplex a plurality of signals input from a plurality of devices and transmit the multiplexed signal to the second connector unit 220 via the electric wire 226B. Further, the multiplexing control circuit 222 may be configured to multiplex a plurality of signals input from a plurality of devices via the respective electric wires 226A and signals transmitted from the multiplexing control circuit 232, and transmit the multiplexed signal to the multiplexing control circuit 12 via the second signal line 24 and the first signal line 14. In this case, the multiplexing control circuit 12 performs a process of separating a plurality of signals included in the multiplexed signal transmitted from the multiplexing control circuit 222. In the example of FIG. 3, the multiplexing control circuit 232 is provided in the third connector unit 230, but the multiplexing control circuit 232 may be provided in a place other than the connector unit (for example, in the electronic device or the like).

According to the configuration of the control system 201 illustrated in FIGS. 2 and 3, it is possible to reduce a size and a scale of the multiplexing control circuit 222 provided in the second connector unit 220 and accordingly it is possible to reduce a size of the second connector unit 220 itself, too. Further, in the wire harness unit 204, the number of wires from the second connector unit 220 can be reduced.

Other Embodiments

The present disclosure is not limited to the embodiments described by the above description and drawings and, for example, the following embodiments are also included in the technical scope of the present disclosure.

The above-described embodiments have illustrated an example in which the multiplexing control circuit of the first connector unit performs both of the process of multiplexing a plurality of digital output signals and transmitting the multiplexed signal to the first signal line and the process of separating a plurality of digital input signals from the multiplexed signal transmitted via the first signal line. However, the multiplexing control circuit of the first connector unit may perform only the process of multiplexing a plurality of digital output signals and transmitting the multiplexed signal to the first signal line, and the multiplexing control circuit of the second connector unit may perform only the process of separating the multiplexed signal. In this case, a plurality of digital input signals input from the outside of the ECU 2 may be input by respective signal lines without being multiplexed.

The multiplexing control circuit of the second connector unit may perform only the process of multiplexing a plurality of digital input signals and transmitting the multiplexed signal to the second signal line, and the multiplexing control circuit of the first connector unit may perform only the process of separating a plurality of digital input signals from the multiplexed signal. In this case, a plurality of digital output signals output from the inside of the ECU 2 to the outside may be output by respective signal lines without being multiplexed.

The above-described embodiments have illustrated an example in which the multiplexed signals in which the digital signals are multiplexed are transmitted between the connector units by the multiplexing control circuit of the first connector unit and the multiplexing control circuit of the second connector unit. However, the multiplexed communication of analog signals may be performed by the multiplexing control circuit of the first connector unit and the multiplexing control circuit of the second connector unit.

The second embodiment has exemplified the configuration in which only one third multiplexing control unit is provided, but a plurality of third multiplexing control units may be provided. For example, a plurality of multiplexing control circuits corresponding to the third multiplexing control unit may be provided in the third connector unit 230 illustrated in FIG. 3. Alternatively, a part of the multiplexed signal input to the multiplexing control circuit 232 may be separated by the multiplexing control circuit 232 illustrated in FIG. 3, and the remaining multiplexed signal may be separated by one or more multiplexing control circuits electrically connected to the multiplexing control circuit 232 via electric wires (not illustrated). In any case, all the multiplexing control circuits that separate the remaining multiplexed signal not separated by the multiplexing control circuit 222 correspond to the third multiplexing control units.

Figure 4:
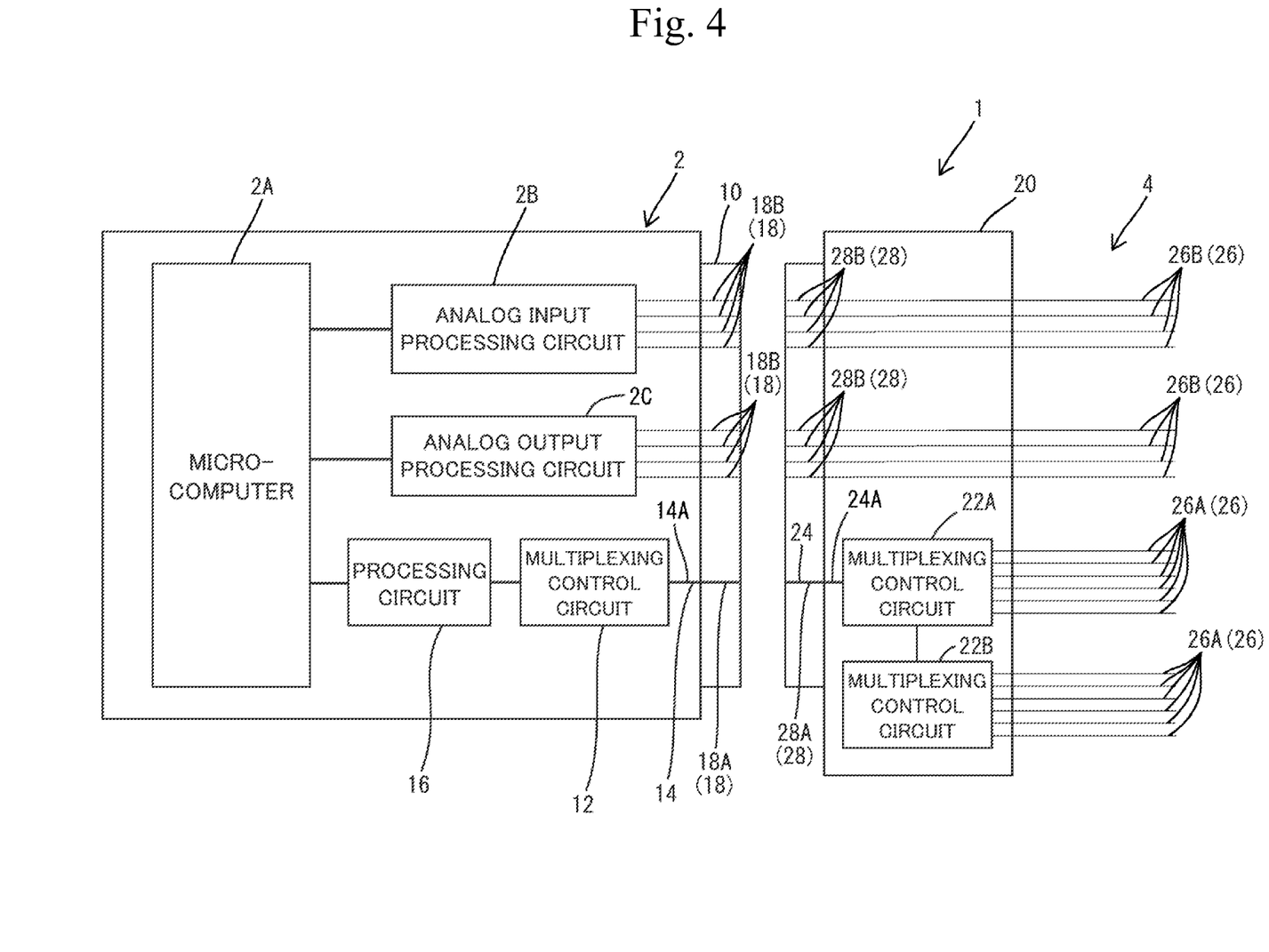
FIG. 4 is a block diagram schematically illustrating a control system according to another embodiment.

The first and second embodiments have illustrated a configuration in which one multiplexing control circuit is provided in the second connector unit. However, in any of the embodiments, a plurality of multiplexing control circuits having the same circuit configuration may be provided in the second connector unit. The configuration illustrated in FIG. 4 is the same as that of the first embodiment except that the multiplexing control circuit 22 illustrated in FIG. 1 is replaced with a plurality of multiplexing control circuits 22A and 22B. Therefore, the same reference numerals are given to the same parts as those of the first embodiment, and the detailed description thereof is omitted. In the example of FIG. 4, a plurality of multiplexing control circuits 22A and 22B are provided in the second connector unit 20, and a plurality of signal lines (the electric wires 26A) is connected to each of the multiplexing control circuits 22A and 22B. For example, all the signals included in the multiplexed signal transmitted from the multiplexing control circuit 12 via the first signal line 14 and the second signal line 24 are separated by the multiplexing control circuits 22A and 22B, and each of the separated signals is transmitted by each electric wire 26A. In addition, the multiplexing control circuits 22A and 22B are each configured to multiplex a plurality of signals input via the electric wires 26A and transmit the multiplexed signal to the multiplexing control circuit 12.

According to such a configuration, it is possible in the second connector unit 20 to generate a multiplexed signal in which more input signals are multiplexed or to separate more signals from an output signal (multiplexed signal), which is more advantageous when the number of signals is large.

The invention claimed is:
1. A control system, comprising:
an electronic control unit used for a vehicle and having a first connector unit; and a wire harness unit having a second connector unit to be connected to the first connector unit in the vehicle, wherein the electronic control unit includes:

a first signal line that is a signal line serving as a transmission path for a multiplexed signal and includes a first terminal arranged in the first connector unit; and a first multiplexing control unit that performs at least one of a process of multiplexing a plurality of signals and transmitting a multiplexed signal to the first signal line and a process of separating a plurality of signals from a multiplexed signal transmitted via the first signal line, and wherein the wire harness unit includes:

a second signal line that is a signal line provided in the second connector unit and serving as a transmission path for the multiplexed signal transmitted via the first signal line and includes a second terminal, the second terminal being configured to be connected to the first terminal when the first connector unit and the second connector unit are coupled together and not to be connected to the first terminal when the first connector unit and the second connector unit are not coupled together; and a second multiplexing control unit that is provided in the second connector unit and performs at least one of a process of separating signals from the multiplexed signal transmitted via the second signal line and a process of multiplexing a plurality of signals and transmitting a multiplexed signal to the second signal line.

2. The control system according to claim 1, wherein the first multiplexing control unit performs at least a process of multiplexing a plurality of signals and transmitting a multiplexed signal to the first signal line, wherein the second multiplexing control unit performs at least a process of separating a part of the signals included in the multiplexed signal transmitted via the second signal line, and wherein the wire harness unit includes:

a cable for transmitting a remaining multiplexed signal not including the signals separated by the second multiplexing control unit out of the multiplexed signal transmitted via the second signal line; and a third multiplexing control unit that separates the remaining multiplexed signal transmitted via the cable.

3. The control system according to claim 2, wherein the first multiplexing control unit performs a process of multiplexing a plurality of digital output signals to be output to an outside of the electronic control unit and transmitting a multiplexed signal to the first signal line and a process of separating a plurality of digital input signals from a multiplexed signal input from the outside of the electronic control unit via the first signal line, and wherein the second multiplexing control unit performs a process of separating a plurality of digital output signals from the multiplexed signal output from the electronic control unit and transmitted via the second signal line and a process of multiplexing a plurality of digital input signals to be input to the electronic control unit and transmitting a multiplexed signal to the second signal line.

4. The control system according to claim 2, wherein the wire harness unit has a plurality of the second multiplexing control units provided in the second connector unit, and a plurality of signal lines is connected to each of the second multiplexing control units.

5. The control system according to claim 1, wherein the first multiplexing control unit performs at least a process of multiplexing a plurality of signals and transmitting a multiplexed signal to the first signal line, wherein the second multiplexing control unit performs at least a process of separating all the signals included in the multiplexed signal transmitted via the second signal line, and wherein the wire harness unit includes a plurality of transmission cables for transmitting the respective signals separated by the second multiplexing control unit.

6. The control system according to claim 5, wherein the first multiplexing control unit performs a process of multiplexing a plurality of digital output signals to be output to an outside of the electronic control unit and transmitting a multiplexed signal to the first signal line and a process of separating a plurality of digital input signals from a multiplexed signal input from the outside of the electronic control unit via the first signal line, and wherein the second multiplexing control unit performs a process of separating a plurality of digital output signals from the multiplexed signal output from the electronic control unit and transmitted via the second signal line and a process of multiplexing a plurality of digital input signals to be input to the electronic control unit and transmitting a multiplexed signal to the second signal line.

7. The control system according to claim 5, wherein the wire harness unit has a plurality of the second multiplexing control units provided in the second connector unit, and a plurality of signal lines is connected to each of the second multiplexing control units.

8. The control system according to claim 1, wherein the first multiplexing control unit performs a process of multiplexing a plurality of digital output signals to be output to an outside of the electronic control unit and transmitting a multiplexed signal to the first signal line and a process of separating a plurality of digital input signals from a multiplexed signal input from the outside of the electronic control unit via the first signal line, and wherein the second multiplexing control unit performs a process of separating a plurality of digital output signals from the multiplexed signal output from the electronic control unit and transmitted via the second signal line and a process of multiplexing a plurality of digital input signals to be input to the electronic control unit and transmitting a multiplexed signal to the second signal line.

9. The control system according to claim 8, wherein the wire harness unit has a plurality of the second multiplexing control units provided in the second connector unit, and a plurality of signal lines is connected to each of the second multiplexing control units.

10. The control system according to claim 1, wherein the wire harness unit has a plurality of the second multiplexing control units provided in the second connector unit, and a plurality of signal lines is connected to each of the second multiplexing control units.

* * * * *